United States Patent [19]

Lesauliner et al.

[11] Patent Number: 4,696,783
[45] Date of Patent: Sep. 29, 1987

[54] ELECTROMAGNETIC CONTROL BAR DRIVE DEVICE, WITH REDUCED HEAT LOSSES

[75] Inventors: Guy Lesaulnier, Courbevoie; Fernand Savary, Saint Leu La Foret, both of France

[73] Assignee: Framatome, Courbevoie, France

[21] Appl. No.: 823,545

[22] Filed: Jan. 29, 1986

[30] Foreign Application Priority Data

Jan. 29, 1985 [FR] France .............................. 85 01216

[51] Int. Cl.⁴ .............................................. G21C 7/12
[52] U.S. Cl. .................................. 376/228; 376/243; 376/367
[58] Field of Search ...................... 376/228, 243, 367

[56] References Cited

U.S. PATENT DOCUMENTS

| | | | |
|---|---|---|---|
| 3,775,247 | 11/1973 | Ode | 376/229 |
| 3,959,071 | 5/1976 | Bevilalqua | 376/233 |
| 4,423,002 | 12/1983 | Wiart | 376/233 |
| 4,472,348 | 9/1984 | Desfortaines | 376/233 |

*Primary Examiner*—Donald P. Walsh
*Attorney, Agent, or Firm*—Pollock, Vande Sande & Priddy

[57] ABSTRACT

The electromagnetic device is suitable for use in actuating a pressurized water reactor control bar. It comprises a shaft and a fluid-tight casing in which are movable longitudinally a first and a second sets of grippers for gripping the shaft, staggered in the longitudinal direction. The first set of grippers is associated with a movable pole co-operating with a holding coil, carried by the casing and movable by energization and de-energization of the coil between a position in which the first set of grippers holds the shaft and a position in which it releases it. The second set of grippers is associated with a movable plunger co-operating with a transfer coil and movable by energization and de-energization of the transfer coil to and from a position in abutment against an other pole. The other pole is movable between two positions spaced apart by a given step. The movable pole belongs to a mechanism for cutting off a path coolant fluid constituting a thermosiphon causing convection flow between the inside of the vessel and the space defined by the casing.

6 Claims, 5 Drawing Figures

ELECTROMAGNETIC CONTROL BAR DRIVE DEVICE, WITH REDUCED HEAT LOSSES

BACKGROUND OF THE INVENTION

1. Field of the Invention

The invention relates to an electromagnetic device for rectilinearly moving a nuclear reactor control bar.

2. Prior Art

Numerous electromagnetic devices developed for that use are already known. An electromagnetic device disclosed in French No. 1,371,802 and Belgian No. 753,529 for rectilinearly moving a shaft releasably secured to a nuclear reactor control bar comprises a fluid tight casing projecting from a cover of the reactor vessel. First and second sets of shaft gripping means, staggered in the longitudinal direction, are longitudinally movable along and within the casing. The first set of means is associated with a movable pole co-operating with a "holding" coil supported by the casing and is moved upon energization and de-energization of the coil between a position in which the first set of means grips the shaft and a position in which it releases it. The second set of means if associated with a rectilinearly movable plunger co-operating with a "transfer" coil and which moves upon energization and de-energization of this coil, between a position in abutment against another pole in which the set of means grips the shaft and a position in which it releases it, said other pole cooperating with a "lift" coil for moving said other pole between two positions spaced apart by a given pitch or step.

Prior art devices of the above-defined type operate satisfactorily. Upon energization of the different coils in a suitable sequence, the shaft and the control bar may be moved step-by-step in one direction or in the other. By supplying only the holding coil with power, the rod is held in a well-defined position. Should the power supply of all coils be cut off, the shaft is released and in the usual case where the bar is placed above the reactor, it falls up to the maximum insertion position in the core; consequently, a power failure affecting the drive devices of all bars causes an emergency stop of "scram".

It has been realised for a long time that devices of the above-described type, whose casing is completely filled with reactor coolant during operation, are a source of considerable heat losses. Convection and conduction phenomena cause heat transfer from the reactor to the casing. The casing must be cooled, in general by ventilation, for maintaining the coils at an acceptable temperature. In a 900 MWe reactor, which may be considered as representative, the total heat power dissipated by each bar drive device is about 8.5 kW. These losses require a powerfl blowing system for heat removal. They will be hardly acceptable in planned advanced reactors (undermoderated light water and/or spectral shift reactors for example) which will have an increased number of control bars.

SUMMARY OF THE INVENTION

It is an object of the invention to reduce the heat losses of electromagnetic rectilinear displacement devices and particularly of the devices of the abovedefined type.

It has been possible to achieve that result only by determining the phenomena which are at the origin of the heat transfers from the reactor. A complete analysis shows that the greater heat flow towards the casings of the devices is due to a thermosiphon phenomenon, which is not obvious and was not appreciated in the past. In the case of a device of the above-defined type, the inventors found that the water flow follows a path of the kind shown by arrows in FIG. 1, inthe casing 10 carrying the lifting, transfer and holding coils 14, 16, 18. A main thermosiphon is formed whose flow path corresponds to arrows f0, f1, f2 and f3, and a secondary thermosiphon is formed which rises up to the top part of casing 10, along the path f0, f4, f5, f2, f3. The main thermosiphon forms a loop which passes round the gripping assembly, contained in the box 19, which is sometimes designated by the term "ratchet box" when the gripping means comprise ratchets co-operating with circumferential grooves in shaft 20, which is the most frequent case. At an intermediate level, the ratchet box comprises a gap 21, formed by grooves required for the passage of the ratchets. But this gap does not contribute appreciably in the formation of the thermosiphon.

It is moreover necessary that a coolant passage exists from the vessel to the top end of casing 10, with as low a pressure loss as possible for bar drop and insertion to be fast as required in the case of an emergency stop or "scram". At first sight then it seems impossible to interrupt or restrict the passages which constitute thermosiphons without increasing the fall time duration of the bars to an unacceptable extent.

The problem is overcome in the invention by integrating the movable pole co-operating with the holding coil in cut-off means for cutting off the main thermosiphon; when the movable pole is in the position in which the first set of means grips the shaft, the pole will form a component of the cut-off means or will control it.

The thermosiphon will be actually cut-off only when the movable pole associated with the first set of means is in such a position as to hold the shaft in place. In practice, this limitation is without inconvenience for the mode of use of the mechanism is such that this situation is the one which is present during about 98% of the operating time of the reactor.

FIG. 2 (in which the parts corresponding to those in FIG. 1 are designated by the same reference number) shows the flow diagram which is then obtained when the first set of gripping means is in the "hold" position and closes, at 32, the return leg (cold leg) of the thermosiphons. The thermosiphon loops can then only close through the restricted passages 21 formed by the apertures for the transfer ratchets. Since the upflow and downflow legs of the thermosiphons must use the same annular space, between the control rod 20 and the ratchet box, over an appreciable length, the flows due to convection are considerably reduced.

Typically, the movable pole co-operating with the holding coil will in general form a movable valve closure member for closing ducts formed in a fixed pole co-operating therewith, the movable pole being applied against the fixed pole when the holding coil is energized.

As mentioned above, the pressure loss impressed to the coolant flow which must pass above the rod upon occurence of a "scram" should be as small as possible. For that, the total flow corss-sectional offered to the ducts may be selected at a value at least equivalent to the cross-sectional area offered by the liquid by the annular gap between the casing and the fixed pole in prior art devices. It is also desirable to reduce the local head losses due in particular to sudden variations in orientation and cross-sectional area of the flow path. To this end, the lower part of the movable pole may be flared so that the fluid streams converge at the inlet to an annular passage formed between the movable pole and the casing.

The invention will be better understood from the following description of a particular embodiment, given by way of example and of a modification thereof. The description refers to the accompanying drawings.

SHORT DESCRIPTION OF THE DRAWINGS

FIGS. 1 and 2, already mentioned, are diagrams showing the thermosiphon flow paths in a conventional control bar displacement device and in a device according to the invention, respectively;

DETAILED DESCRIPTION OF THE INVENTION

Figure 2:
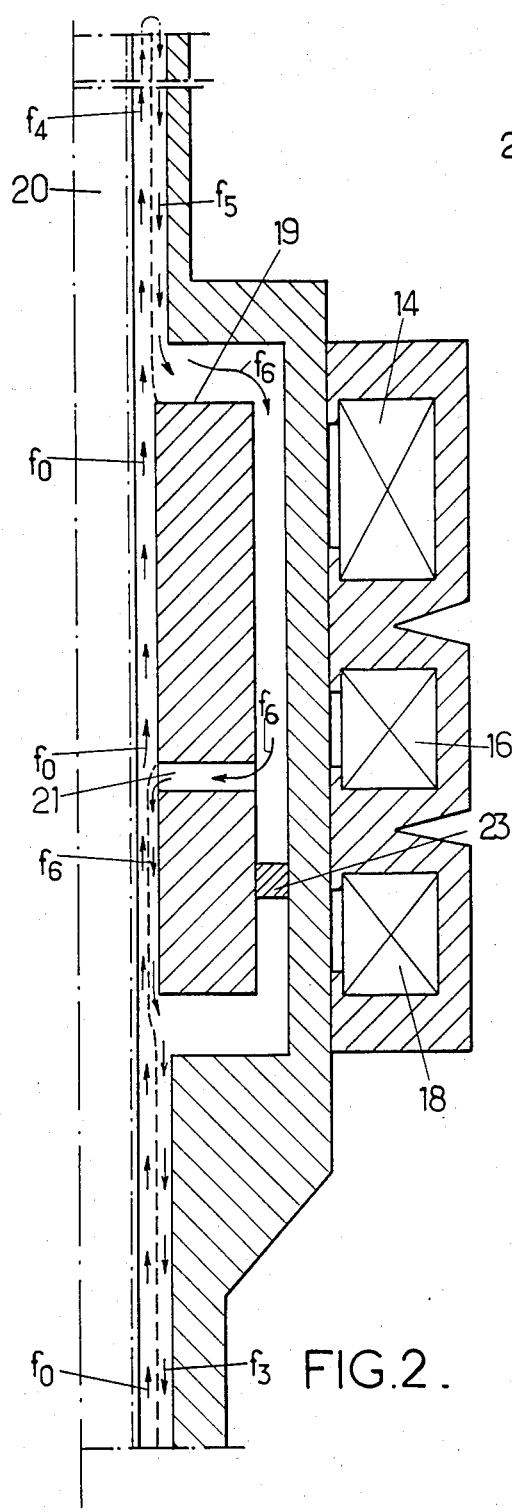
Figure 1:
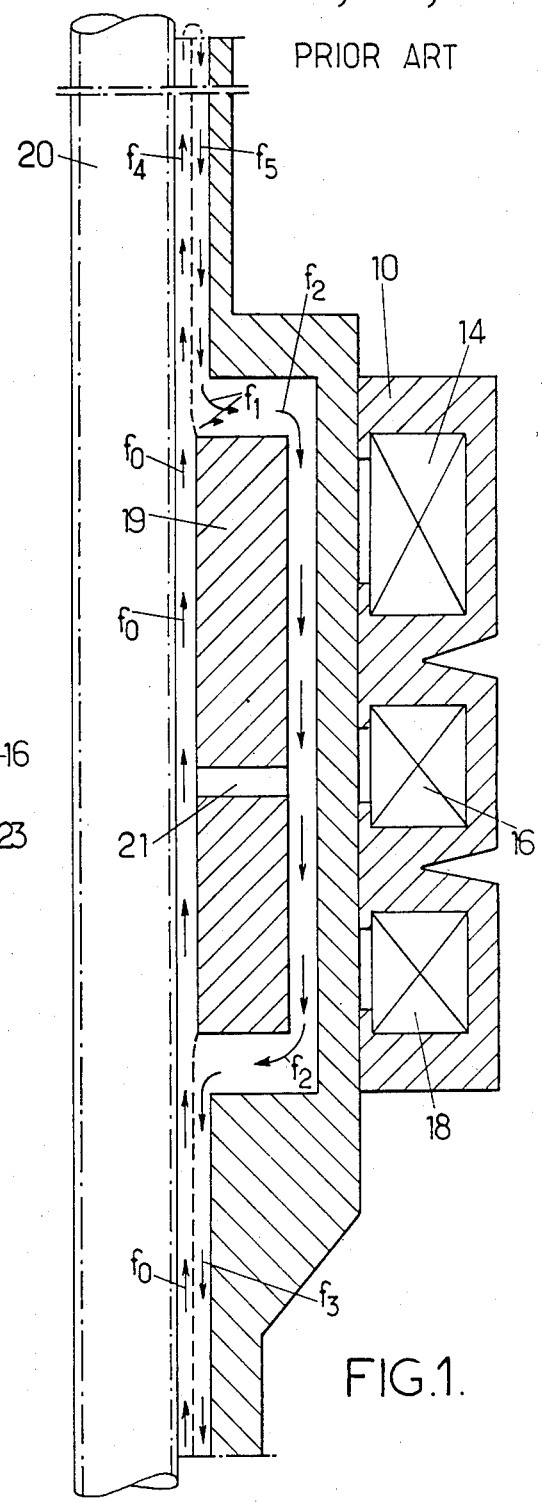
Figure 3:
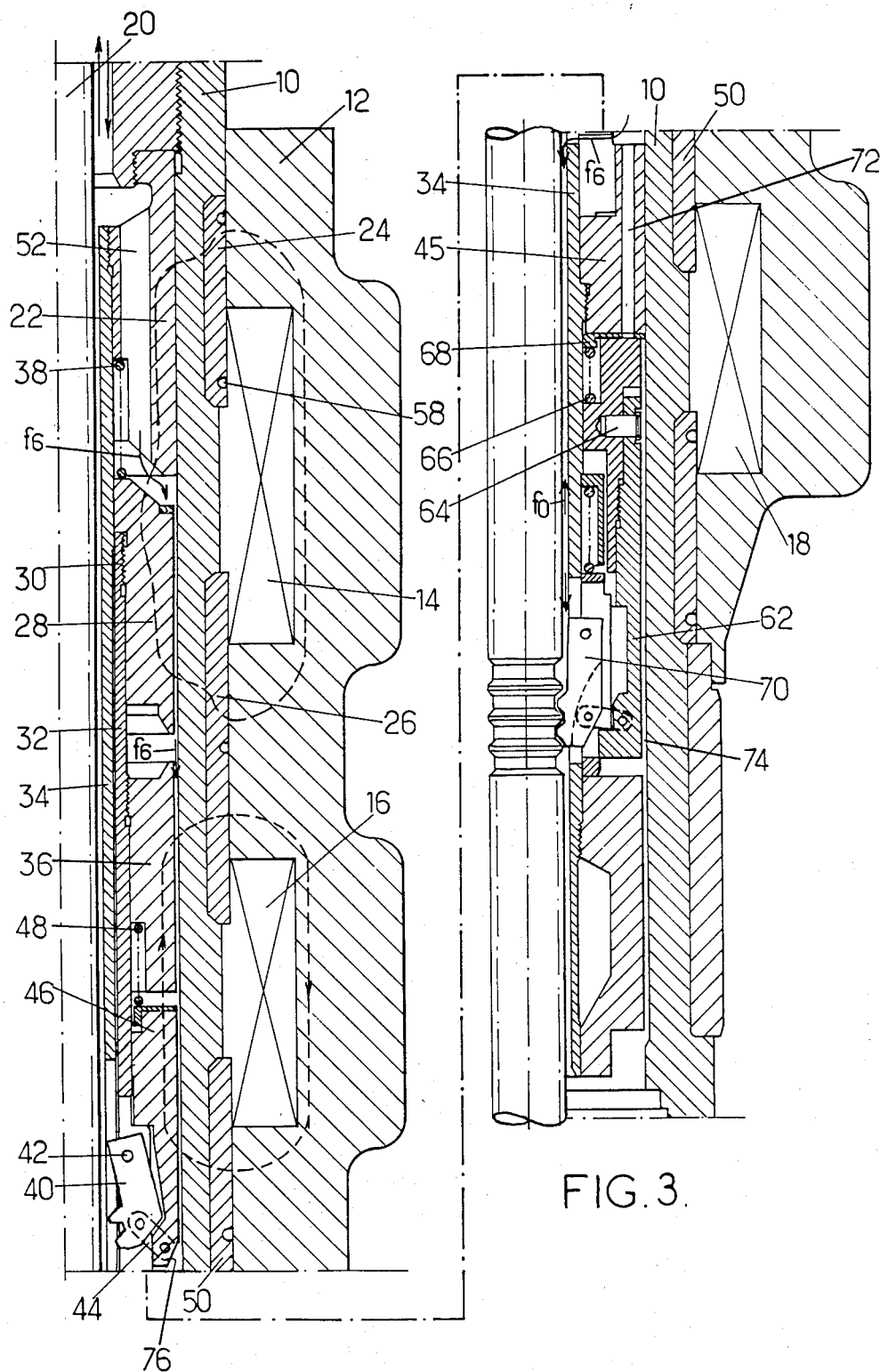
FIG. 3 shows a drive device according to a particular embodiment of the invention, in half-section through a plane passing through the axis thereof.

Referring to FIG. 3, there is shown a device for rectilinearly moving a control bar of a PWR. Its general construction will only be described briefly, since it is similar to known constructions.

The device comprises a fluid tight external casing 10 to which is fixed a carcase 12 of ferromagnetic material defining with the casing annular chambers receivng three coils 14, 16 and 18 (lifting coil, transfer coil and holding coil). The shaft 20 to be moved is mounted along the axis of a channel defined by casing 10. The shaft is formed with evenly spaced grooves for engagement by the second means and the first means mentioned above, which will be described successively.

The second means comprise an annular stationary pole 22 which co-operates with the carcase 12 and two magnetic rings 24 and 26 secured to casing 10 so as to form the fixed part of a magnetic circuit whose movable part is formed by a lifting pole 28. Pole 28 is secured, for example by a threaded connection 30, to a sleeve 32 slidably received on a liner 34 whose upper end is secured to the fixed pole 22. Sleeve 32 carries a transfer pole 36. A return spring 38 compressed between the fixed pole 22 and the movable lifting pole 28 biases the movable unit comprising poles 28 and 36 and sleeve 32 towards the lower abutment position in which it is shown in FIG. 3. This abutment position is defined by abutment of the lower end surface of sleeve 32 against a fixed annular pole 46 whose role will be explained later. Energization of coil 14 creates a magnetic field which raises the movable pole 28 until it contacts the fixed pole 22.

Several transfer ratchets or grippers 40 (three for example) are evenly distributed about shaft 20. Each gripper is carried by a pin 42 fixed to sleeve 32 for pivotal connection. Each of the ratchets or grippers 40 is movable between a rest position in which it is shown in FIG. 3 and a work position in which it is engaged in grooves or shaft 20. A mechanism for controlling the ratchets comprises a magnetic material plunger 46 slidably received on sleeve 32 and links 44 each pivotably connected to a ratchet and to plunger 46. A return spring 48 compressed between the transfer pole 36 and plunger 46 tends to hold this latter in the rest position in which it is shown in FIG. 3, in which the ratchets 40 are disengaged from the shaft. The transfer coil 16 is placed so that, when energized, it creates a magnetic field in a circuit comprising the carcase 12, the magnetic ring 26, the transfer pole 36, the plunger 46 and another magnetic ring 50 and moves or retains the plunger into abutment against the transfer pole 46.

It can be seen that energization of coil 16, then of coil 14 without de-energization coil 16, results in an upward movement of the shaft by one predetermined step.

The first means, co-operating with the holding coil 18, also are of overall conventional construction. These means are shown in FIG. 3 in the position assumed when coil 18 is energized. They comprise a movable pole 62 in two parts connected by a screw thread and interlocked by means of a pin 64. The return spring 66, acting against the electromagnetic force of coil 18, is housed in a recess in pole 62. A ring 68 of nonmagnetic material may advantageously be interposed between spring 66 and the fixed pole 45. This ring, whose portio which separates poles 62 and 46 may be very thin, avoids the risk of sticking caused by remanent magnetism. Holding ratchets 70 are mounted as ratchets 40 and are controlled by the movable pole 62.

According to the invention, the movable pole 62 and the fixed pole 45 of the first means form a valve which is closed when the holding coil is energized and is open when the coil is de-energized and when the movable pole is separated from the fixed pole. That valve is placed in the down going leg or cold leg of the path of water flow by thermosiphon and arranged to cut-off the thermosiphon. As shown, the fixed pole 45 does not leave any substantial gap for water flow between it and casing 10. On the other hand, several passages 72 parallel to the axis of the rod are formed in the fixed pole 45. The total water flow cross-sectional area of the passages is sufficient for the pressure loss impressed to water when the bar is dropped to remain acceptable. By way of example, in present PWRs in which the casing 10 has an internal diameter of 133 mm. sixteen holes may be provided having a diameter of 11 mm each.

The passages 72 reduce the cross-section of ferromagnetic material offered to the field lines of the magnetic field created by coil 18. As a counterpart, it is desirable to reduce the diameter of the recess of the return spring 66 which also holds ring 68 against the fixed pole 45, so as to restore a sufficient value to the cross-section of ferromagnetic material.

Ring 68, formed with holes in alignment with passages 72, forms the seat of a valve whose movable closure member is the movable pole 62 whose external diameter is sufficient for it to cover the holes formed in ring 68 and close them when it is applied against the fixed pole by coil 18. A clearance 74 between this movable pole and casing 10 forms a flow path for water upon bar fall, as will be seen later.

When the valve is closed, as shown in FIG. 3, convection flow can no longer occur except through the apertures (arrows f6) and they are reduced. For a conventional device inwhich the total heat generation is 8.5 kw, the major part of the 4.5 kW power generated at the level of the coils will be saved by using the invention. The balance of the heat power comes essentially from the heat transmitted by the cover of the reactor and by the mechanism adapters welded to the cover. This transmission may be reduced by a layer of heat insulation on the cover. The heat flow through the ratchet box and into the upper sheath is comparatively small.

The pressure loss undergone by the water which must flow toward the space above the shaft when the bar is dropped should be reduced as much as possible. For that, it is advisable to reduce the local pressure losses as much as possible. In the case illustrated in FIG. 3, the lower part of pole 46 has a frusto-conical shape. Thus a convergent zone 76 is formed favorable to a reduction of the pressure losses and which, in addition, makes the change of orientation of the water streams less sudden.

When the bar and shaft 20 are dropped, the water which must pass from the vessel of the reactor to the space situated above the rod flows along the path of the hot and cold legs of the thermosiphons. It flows more particularly in the direction opposite to arrows f3, f2, f6 and f5.

Figure 4A:
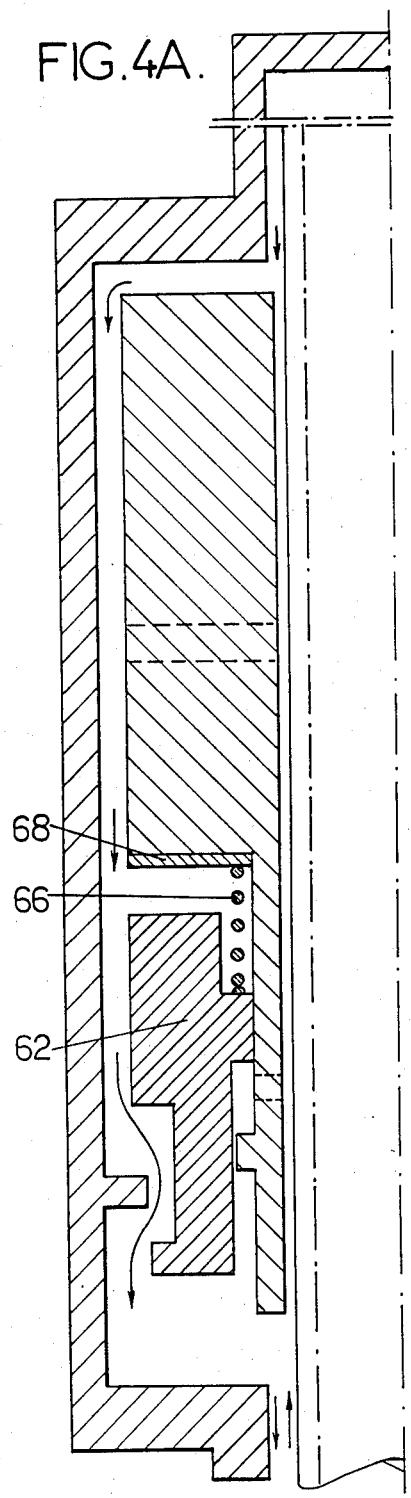
FIGS. 4A and 4B are schematic illustrations of a modified embodiment, respectively in open and closed positions.
Figure 4B:
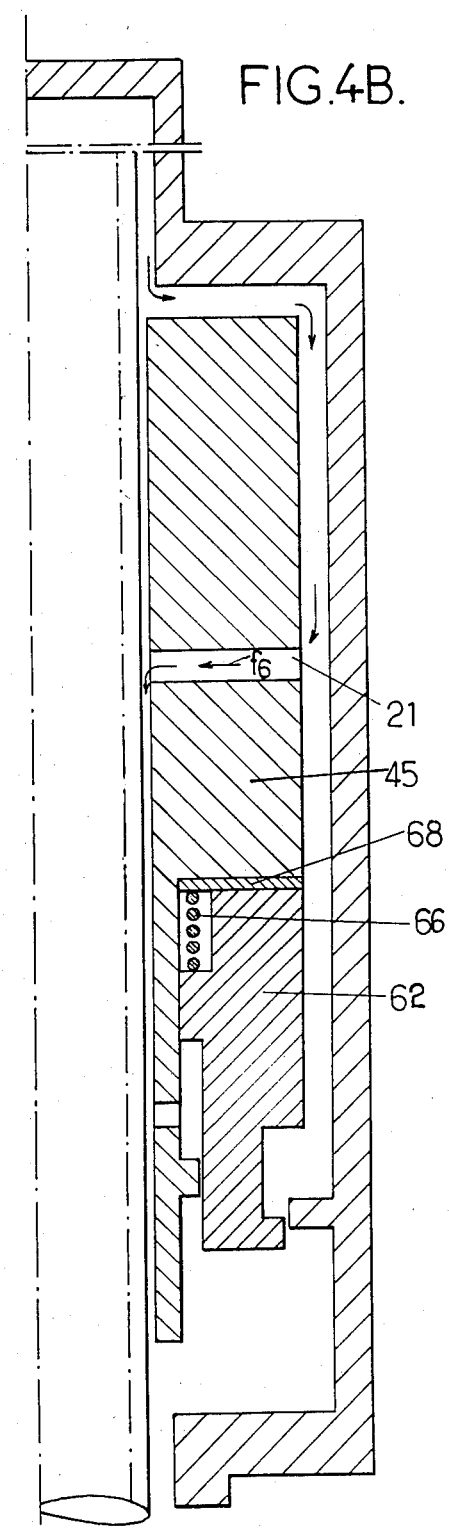

Embodiments other than those in which the movable pole and/or the fixed pole of the holding electromagnetic means form components of a cut-off valve are possible and may fulfil the function of cutting off the cold leg of the main loop of the thermosiphon. Slide valve devices, such as that shown schematically in FIGS. 4A and 4B (where the parts corresponding to those of FIG. 3 are designated by the same reference numbers) may fulfil the same function. The movable pole 62 then operates as a slide valve closure member.

The particular embodiments which have been described are in no way exclusive. The fixed and movable holding poles may be associated differently from those contemplated. It should be understood that such variations, as well more generally as those in which the movement of the movile pole of the holding electromagnetic stage is used for cutting off the flow in the main thermosiphon loop when the movable pole 62 is attracted by the fixed pole 45, are within the scope of the invention.

We claim:

1. In a nuclear reactor having a coolant containment vessel closed with a lid, an electromagnetic device for rectilinearly moving a shaft connectable to a control bar, comprising a fluid tight casing projecting from the reactor vessel lid; a first and second sets of shaft gripping means for gripping the shaft, staggered in the longitudinal direction and movable longitudinally of said casing, the first set of means being associated with a first movable pole co-operating with a holding coil, carried by the casing and movable by energization and de-energization of the holding coil between a position in which the first set of means grips the shaft and a position in which it releases said shaft, and the second set of means being associated with a movable plunger co-operating with a transfer coil and movable, by energization and de-energization of this coil., between a position in abutment against an other pole in which the second set of means grips the shaft and a position in which it releases said shaft; a lifting coil co-operating with said other pole for moving said other pole between two positions spaced apart by a predetermined step, wherein the movable pole co-operating with the holding coil belongs to means for cutting off a thermosiphon for connection flow of coolant between the inside of the vessel and a space defined by the casing.

2. A device according to claim 1, wherein the first movable pole forms a movable valve closure member for closing passages formed in the associated fixed pole which is formed to prevent coolant fluid between it and the casing.

3. A device according to claim 2, wherein an amagnetic material ring is retained in contact with the fixed pole by a spring bearing on the movable pole and is formed with holes aligned with the passages.

4. A device according to claim 1, wherein the first movable pole is slidably received on a fixed sleeve fast with the fixed poles and an annular gap is formed between the first movable pole and the casing.

5. A device according to claim 1, wherein a path of coolant flow from the vessel to the top of the casing when the shaft and bar are dropped is designed so as to reduce coolant pressure losses.

6. A device according to claim 5, wherein an external surface of the plunger defines with the casing a coolant flow gap and has a frusto-conical shape at its lower part for defining a convergent portion for coolant flow into the gap.

* * * * *